May 26, 1925.

G. SHAW

MEANS FOR LOCKING NUTS UPON BOLTS

Filed March 29, 1923

1,539,213

Inventor
George Shaw.

By his Attorney :- J. O. Connell

Patented May 26, 1925.

1,539,213

UNITED STATES PATENT OFFICE.

GEORGE SHAW, OF ASHTON-UNDER-LYNE, ENGLAND.

MEANS FOR LOCKING NUTS UPON BOLTS.

Application filed March 29, 1923. Serial No. 628,629.

*To all whom it may concern:*

Be it known that I, GEORGE SHAW, subject of the King of Great Britain and Ireland, and resident of Ashton-under-Lyne, in the county of Lancaster, England, have invented a new or Improved Means for Locking Nuts upon Bolts, of which the following is a specification.

These improvements relate to nuts for use upon bolts and to means for locking the said nuts upon their bolts, and, more specifically, to nuts and locking means therefor wherein the nut is provided with a central recess for the reception of a central tubular boss of a locking stud, such as described in the specification to my prior British Patent No. 184245 dated the 3rd May 1921. The object of these improvements is to provide locking means for a nut upon a bolt or the like which means will give a maximum of efficiency and will be simple in operation and inexpensive in construction.

With this object in view, I provide the nut with a recess as indicated in my previous specification above referred to, and a locking stud having a tubular boss also as disclosed in the said previous specification. By these present improvements however, the boss of the locking stud is formed eccentrically to the bore of the nut, and the said boss is so formed as to be radially compressible, as for instance by saw cuts formed therein. The recess in the nut is formed to receive the tubular boss, that is to say, it will also be eccentric to the bore of the nut. The locking stud being engaged with the nut recess and the two being placed upon a threaded bolt, angular movement of the locking stud in relation to the nut will, owing to the eccentricity of the tubular boss, have the effect of jamming the outer periphery of the locking stud boss against the inner wall of the nut recess, and, the angular movement proceeding, the tubular boss will be pressed radially inwards upon the bolt thread, thus forming a very effective lock.

The tubular boss of the locking stud may be provided with a peripheral groove, for the reception of a locking pin or screw, as will be hereinafter fully described. Further, the locking stud may be employed as a washer if desired, with projections formed thereon to engage with the work, the nut being screwed upon the bolt to engage with the locking stud.

The improved locking means render the employment of different hand thread upon the bolt, e. g. a right hand thread for the nut and a left hand thread for the locking stud, unnecessary.

The improvements will now be fully described with reference to the accompanying drawings, which are all to scale, and in which:—

Figure 1:
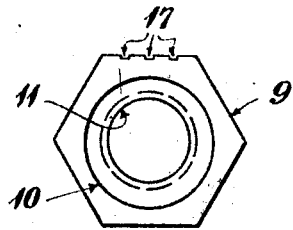
Figure 1 is an elevation of a nut showing the central recess therein.
Figure 2:
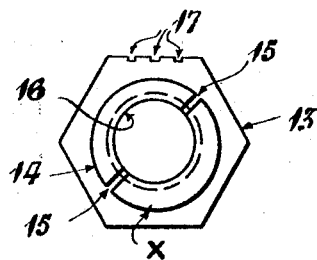
Figure 2 is an elevation of the locking stud showing the tubular boss.
Figure 3:
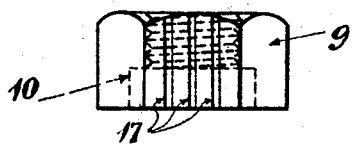
Figures 3 and 4 are plans of the nut of Figure 1, and of the locking stud of Figure 2 respectively.
Figure 4:
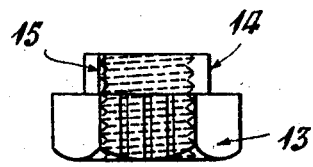
Figure 5:
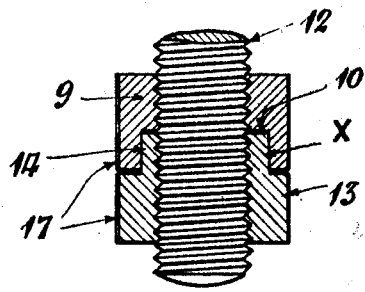
Figures 5 and 6 are respectively a cross section and a side elevation of the combined nut and locking stud upon a bolt.
Figure 6:
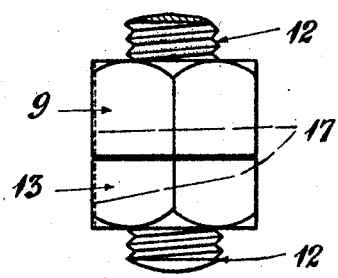

The nut 9, Figures 1 and 3, may have the usual outward formation, a hexagonal nut being shown in the drawings. It is provided with a recess 10, and its bore 11 is tapped for engagement with the thread of a bolt 12 as usual. The locking stud 13, Figures 2 and 4, is formed with a tubular boss 14 provided with saw cuts 15, and an internally threaded bore 16 for engagement upon the bolt. It will be seen on reference to Figures 1 and 2 that whereas the bore 11 of the nut 9 is concentric to the said nut, and the bore 16 of the locking stud 13 concentric with the said stud, the latter bore 16 is eccentric to the stud boss 14. The circular wall of boss 14 varies therefore in thickness, as clearly shown in Figure 2, and the recess 10 in the nut 9 is formed accordingly to receive the boss 14 with an easy sliding fit. Figures 5 and 6 show the locking stud boss 14 inserted in the nut 9, the eccentricity of the said locking stud boss to the bore 11 of the nut being clearly shown in Figure 5 in section. The nut 9 and locking stud 13 being put together as in Figures 5 and 6, and placed upon the bolt 12, the two are screwed up together upon the bolt in the manner of a single nut until the face of the nut abuts against the work. The nut 9 then being held by means of a spanner or other suitable tool, the locking stud 13 is screwed up singly upon the bolt, with the result that the thicker portion *x* of the clocking stud boss (Figures 2 and 5) comes against part of the inner wall of the recess 10 of the nut 9 as shown in the same figure. Continued screwing thus tends to force the outer face of the tubular boss 14 against the inner face of the recess 10, and owing to the saw cuts 15 the walls of the locking stud boss are pressed tightly radially upon the bolt thread, thus forming a very efficient lock for the nut 9, and establishing a high frictional grip between the nut and its locking stud.

The outer face of nut 9 and of the locking stud 13 may be grooved as shown at 17 for the guidance of the operator. The locking stud may be easily inserted in the recess 10 of the nut 9 when the grooves 17 on both members register, this being the "non-lock" position.

Figure 7:
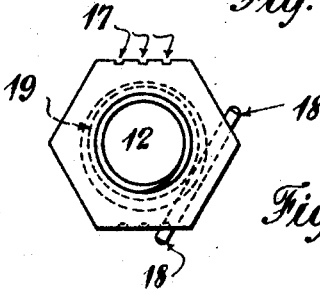
Figure 7 is an end elevation of the combined nut and locking stud showing the position of a locking pin therein.

In Figure 7 is illustrated the application of a locking pin to the nut and locking stud just described. 18 is a locking pin, which may be cylindrical or tapered, and which passes through holes in the face of the nut 9 and engages within a groove 19 formed around the periphery of the tubular boss 14. The latter being eccentric to the bore 16 of the stud 13, machining say in a lathe by ordinary means of the said groove will have the effect that the depth thereof will gradually vary. The insertion of the pin 18 will therefore effectually prevent the movement of the locking stud 13 longitudinally upon the bolt and relatively to the nut, and further, owing to the eccentricity of the groove 19 in relation to the boss 14, will act as a further preventative to the angular movement of the locking stud in relation to the nut.

Figure 8:
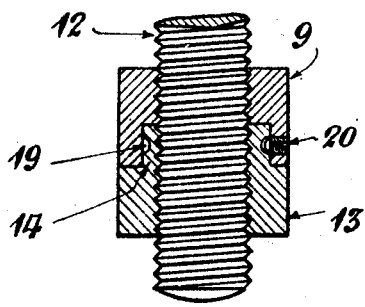
Figure 8 is a cross section showing a grub screw substituted for the locking pin of Figure 7.

Instead of a locking pin 18 as shown in Figure 3, a set screw or grub screw 20 may be used as the means for locking the nut 9 and stud 13 together. In this case a hole is drilled in the nut 9, radially to the bore thereof, as shown in Figure 8, and tapped for the reception of the screw. The end of the latter engaging in the groove 19 will have the same effect as the engagement of the locking pin 18 in the said groove.

The saw cuts 15 may be omitted in any case where it is considered that the tubular boss 14 is sufficiently compressible without them to obtain the desired gripping effect upon the bolt thread.

I claim:—

Means for locking a threaded nut upon its bolt, comprising a central smooth bored recess in said nut, a locking stud bored and threaded to fit upon the bolt, a radially compressible tubular boss upon the locking stud to engage in the nut recess, the outer wall of the said tubular boss being eccentric to the said nut recess, a peripheral groove formed exteriorly upon the tubular boss, the said groove being concentric with the bore of the nut and eccentric to the boss of the locking stud, and an orifice in the nut through which a locking device may be pressed to engage within the groove and prevent relative radial movement of the bolt and locking stud and maintain the grip of the latter upon the bolt thread.

In testimony whereof I have hereunto set my hand.

GEORGE SHAW.